(12) United States Patent
Khusit (10) Patent No.: US 12,435,917 B2
(45) Date of Patent: Oct. 7, 2025

(54) REDUCING COOLING LOSS FROM A WALK-IN REFRIGERATOR

(71) Applicant: Anthony, Inc., Sylmar, CA (US)

(72) Inventor: Alexander Khusit, Winnetka, CA (US)

(73) Assignee: Anthony, Inc., Sylmar, CA (US)

( * ) Notice: Subject to any disclaimer, the term of this patent is extended or adjusted under 35 U.S.C. 154(b) by 161 days.

(21) Appl. No.: 18/451,450

(22) Filed: Aug. 17, 2023

(65) Prior Publication Data

US 2025/0060146 A1   Feb. 20, 2025

(51) Int. Cl.
| | |
|---|---|
| *A47F 3/04* | (2006.01) |
| *E06B 3/46* | (2006.01) |
| *F25D 21/04* | (2006.01) |
| *F25D 21/08* | (2006.01) |
| *F25D 23/02* | (2006.01) |
| *F25D 13/00* | (2006.01) |
| *F25D 23/08* | (2006.01) |

(52) U.S. Cl.
CPC ............ *F25D 21/04* (2013.01); *A47F 3/0434* (2013.01); *F25D 21/08* (2013.01); *F25D 23/02* (2013.01); *E05Y 2900/202* (2013.01); *E05Y 2900/31* (2013.01); *F25D 13/00* (2013.01); *F25D 23/021* (2013.01); *F25D 23/028* (2013.01); *F25D 23/087* (2013.01); *F25D 2700/04* (2013.01)

(58) Field of Classification Search
CPC ........ F25D 21/04; F25D 21/08; F25D 23/021; F25D 23/02; F25D 23/028; F25D 13/00; A47F 3/0434; A47F 3/043; E05Y 2900/31; E05Y 2900/202
See application file for complete search history.

(56) References Cited

U.S. PATENT DOCUMENTS

| | | | | | |
|---|---|---|---|---|---|
| 2,793,405 | A | * | 5/1957 | Focht .................... | E06B 3/4681 49/490.1 |
| 3,177,989 | A | * | 4/1965 | Di Chiaro ............. | F25D 23/021 49/501 |
| 4,004,370 | A | * | 1/1977 | Heaney ................... | F25D 23/02 49/504 |
| 4,815,246 | A | * | 3/1989 | Haas ...................... | E06B 3/4618 49/404 |
| 2006/0283850 | A1 | * | 12/2006 | Davey ................... | A47F 3/0404 219/385 |
| 2013/0285517 | A1 | * | 10/2013 | Wach ...................... | A47F 3/043 49/504 |
| 2015/0223619 | A1 | * | 8/2015 | Artwohl .................. | A47F 3/002 428/69 |

(Continued)

OTHER PUBLICATIONS

[No Author Listed] [Brochure], Anthony, A Dover Company, "Automatic Beer Cave Door Series," Optimized Merchandising, Anthony, Inc., 2017, 2 pages.

(Continued)

*Primary Examiner* — Kimberley S Wright
(74) *Attorney, Agent, or Firm* — Fish & Richardson P.C.

(57) ABSTRACT

A refrigeration system having a refrigerated enclosure and a door coupled to the refrigerated enclosure. The door controls access to the refrigerated enclosure. The door has a glass assembly, an outer frame surrounding an outer perimeter of the glass assembly, an insulation assembly coupled to the outer frame on an interior surface of the outer frame, and a heater system configured to heat the outer frame.

11 Claims, 3 Drawing Sheets

(56) References Cited

U.S. PATENT DOCUMENTS

2019/0221144 A1* 7/2019 Artwohl ............... A47F 3/0434

OTHER PUBLICATIONS

[No Author Listed] [Brochure], Horton, "ProSlide® Series 2021 Belt Drive System," Horton Automatics, 2021, 2 pages.
[No Author Listed] [Manual], Horton, "Owner's Manual for Automatic Sliding Doors, Including Low Energy Automatic Sliding Doors," Horton Automatics, Jun. 2000, 8 pages.
hortondoors.com [online], "Series 2021 ECO Belt Drive," Aug. 2021, retrieved on Apr. 18, 2024, retrieved from URL<https://www.hortondoors.com/sliding-door-systems/commercial-products/s2021-eco-belt-drive-slide-door-standard-header/>, 6 pages.

* cited by examiner

REDUCING COOLING LOSS FROM A WALK-IN REFRIGERATOR

TECHNICAL FIELD

This disclosure relates to reducing cooling loss from a walk-in refrigerator, in particular, by insulating a refrigerator door on the walk-in refrigerator.

BACKGROUND

Walk-in refrigerators are cooled devices for storing foods and beverages. For example, a walk-in refrigerator can be a beer cave in a convenience store or a gas station. Walk-in refrigerators can have doors which are operated to control access to the contents of the walk-in refrigerator to allow a customer to enter the walk-in refrigerator to view and retrieve the refrigerated foods and beverages. Even when shut, the door to the walk-in refrigerator can allow a loss of cooling from within the walk-in refrigerator to a space outside the walk-in refrigerator. In some cases, the loss of cooling from within the walk-in refrigerator to the space outside the walk-in refrigerator is above a heat transfer threshold, resulting excessive energy required to cool and maintain the stored foods and beverages in a cooled state.

SUMMARY

This disclosure describes systems and methods related to insulating a walk-in refrigerator door. Walk-in refrigerators store foods and beverages in a cooled state. Cooling from the walk-in refrigerator can be lost through the walk-in refrigerator door. Walk-in refrigerators have doors which can be operated, that is, opened and closed, to access the foods and beverages contained in the walk-in refrigerator. Cooling from within the walk-in refrigerator can pass through the walk-in refrigerator even when walk-in refrigerator door is closed. For example, warmer air from outside the walk-in refrigerator can pass through gaps or spaces between components and into the walk-in refrigerator (i.e., ingress into the refrigerated space). For example, heat can be transferred by conduction from the warmer space outside the walk-in refrigerator through components of walk-in refrigerator door into walk-in refrigerator. This approach seals and insulates the walk-in refrigerator door.

In one aspect, a refrigeration system includes a refrigerated enclosure and a door coupled to the refrigerated enclosure. The door controls access to the refrigerated enclosure. The door has a glass assembly, an outer frame surrounding an outer perimeter of the glass assembly, an insulation assembly coupled to the outer frame on an interior surface of the outer frame, and a heater system to heat the outer frame.

In some embodiments, the glass assembly includes a three-pane glass assembly. In some cases, the three-pane glass assembly is non-heated. In some cases, each of the panes of the three-pane glass assembly are separated by a gas layer.

In some embodiments, the glass assembly includes a first three-pane glass assembly coupled to a first frame of the outer frame and a second three-pane glass assembly coupled to a second frame of the outer frame. The second three-pane glass assembly is movable relative to the first three-pane glass assembly. The first frame is fixed in the outer frame. In some cases, the second frame slides relative to the first frame allowing access to an interior of the refrigerated enclosure. In some cases, the second frame rotates relative to an edge of the first frame allowing access to an interior of the refrigerated enclosure. In some cases, the glass assembly has a center wiper coupled to the first frame and extending interior to the refrigerated enclosure. A portion of the center wiper slidably across an outer surface of the second three-pane glass assembly. In some cases, the insulation assembly has an outer side surface panel coupled to an outer side surface of the first frame.

In some embodiments, the insulation assembly includes a first frame insulation panel coupled to an interior surface of the first frame and a second frame insulation panel coupled to an interior surface of the second frame.

In some cases, the first frame insulation panel includes a bottom insulation panel, a top insulation panel, a first insulation side panel, and a second insulation side panel. The bottom insulation panel extends along an inner bottom portion of the interior surface of the first frame. The top insulation panel extends along an inner top panel of the interior surface of the first frame. The first insulation side panel extends along an outer side portion of the interior surface between the top insulation panel and the bottom insulation panel. The second insulation side panel extends along an inner side portion of the interior surface corresponding to a mullion of the first frame, opposite the first insulation side panel. In some cases, the second frame insulation panel includes a bottom insulation panel extending along an inner bottom portion of the interior surface of the second frame and a inner side panel extending along an inner side of the second frame.

In some embodiments, the insulation assembly includes a top insulation panel coupled to an inner top surface of the outer frame.

In some embodiments, the insulation assembly includes a pair of side insulation panels positioned on outer side surfaces of the outer frame.

In some embodiments, the insulation assembly is coupled to the outer frame by at least one of double-sided tape or rivets. In some cases, the rivets are push-in plastic rivets.

In some embodiments, the heater system further includes heater wires positioned within the outer frame.

In some embodiments, the refrigeration system includes a bottom wiper coupled to the outer frame and extending in an upward direction relative to a bottom surface of the refrigerated enclosure. The door can be in contact with the bottom wiper and moves relative to the bottom wiper. The bottom wiper can reduce an infiltration of air from a space outside the refrigerated enclosure past the door into an inner volume of the refrigerated enclosure.

In another aspect, refrigerator door includes an outer frame, a fixed door, a sliding door, a center wiper, a bottom wiper, a heater system, and an insulation kit. The fixed door is positioned in the outer frame. The fixed door has a first glass assembly having three glass panes separated by gas layers. The sliding door is positioned in the outer frame. The sliding door slides relative to the fixed door between a first position preventing a flow of air through the outer frame and a second position allowing the flow of air through the outer frame. The sliding door has a second glass assembly having three glass panes separated by gas layers. The center wiper extends between from a top portion of the outer frame to bottom portion of the outer frame. The center wiper extends between the fixed door and the sliding door. The center wiper reduces a flow of air between the fixed door and the sliding door. The bottom wiper is coupled to the outer frame and extending in an upward direction interior the outer frame. The sliding door is in contact with the bottom wiper. The bottom wiper reduces a flow of air between the sliding door and the outer frame. The heater system includes multiple heater wires coupled to the outer frame. The insulation kit includes a top insulation panel, a pair of side insulation panels, a bottom insulation panel, a tip insulation panel, a first insulation side panel, a second insulation side panel, a bottom insulation panel, an inner side panel, and multiple fasteners. The top insulation panel is coupled to an inner top surface of the outer frame. The pair of side insulation panels are positioned on outer side surfaces of the outer frame. The bottom insulation panel extends along an inner bottom portion of the interior surface of the fixed door. The top insulation panel extends along an inner top panel of the interior surface of the fixed door. The first insulation side panel extends along an outer side portion of the interior surface between the top insulation panel and the bottom insulation panel. The second insulation side panel extends along an inner side portion of the interior surface corresponding to a mullion of the fixed door, opposite the first insulation side panel. The bottom insulation panel extends along an inner bottom portion of the interior surface of the sliding door. The inner side panel extends along an inner side of the sliding door. The fasteners include at least one of push-in plastic rivets and double-sided tape. The fasteners couple each panel to the respective outer frame, the fixed door, and the sliding door.

Implementations of the present disclosure can realize one or more of the following advantages. These systems and methods can reduce loss of cooling from the walk-in refrigerator. For example, positioning wipers in gaps between the sliding door and the outer frame and the sliding door and the fixed door can reduce an flow of air between the space outside the walk-in refrigerator and the interior of the walk-in refrigerator such as an inflow of warmer air into the walk-in refrigerator or an outflow of cooler air from the walk-in refrigerator. For example, placing insulation panels on the inner and side surfaces of the walk-in refrigerator door can reduce a rate of heat transfer across the walk-in refrigerator and the walk-in refrigerator door.

These systems and methods can improve cooling of the walk-in refrigerator. For example, decreasing loss of cooled air in the walk-in refrigerator and impeding heat transfer can improve cooling of the walk-in refrigerator.

These systems and methods can decrease energy consumption. For example, by reducing the heat transferred across the walk-in refrigerator door and decreasing air flow through the walk-in refrigerator door, less electrical energy can be required to maintain a temperature of the walk-in refrigerator below a threshold cooling temperature, decreasing energy consumption.

These systems and methods can increase walk-in refrigerator operating and cooling efficiency. For example, by reducing cooling losses, walk-in refrigerator system operating efficiency can be increased.

These systems and methods can increase walk-in refrigerator component life. For example, by reducing cooling losses, walk-in refrigerator system components can operate less, decreasing wear and damage on walk-in refrigerator components, increasing walk-in refrigerator component life.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure relates to reducing cooling loss from a walk-in refrigerator. This approach insulates walk-in refrigerator door to reduce loss of cooling from the walk-in refrigerator. The walk-in refrigerator (a refrigeration system) includes a refrigerated enclosure and a door coupled to the refrigerated enclosure. The door controls access to the refrigerated enclosure. The door has a glass assembly, an outer frame surrounding an outer perimeter of the glass assembly, an insulation assembly coupled to the outer frame on an interior surface of the outer frame, and a heater system to heat the outer frame.

Walk-in refrigerators contain a volume of cooled air at an internal temperature lower than an outer ambient temperature to store items in a cooled state. For example, walk-in refrigerators can store foods and beverages in the cooled state to maintain freshness or shelf life. Walk-in refrigerators have doors which can be operated by a user relative to a cabinet frame of the refrigerator, that is, opened and closed, so the user can enter into the refrigerated enclosure and access the foods and beverages contained in the walk-in refrigerator. The walk-in refrigerator door can be a source of loss of cooling from the walk-in refrigerator. This approach reduces cooling loss from the walk-in refrigerator.

Figure 1A:
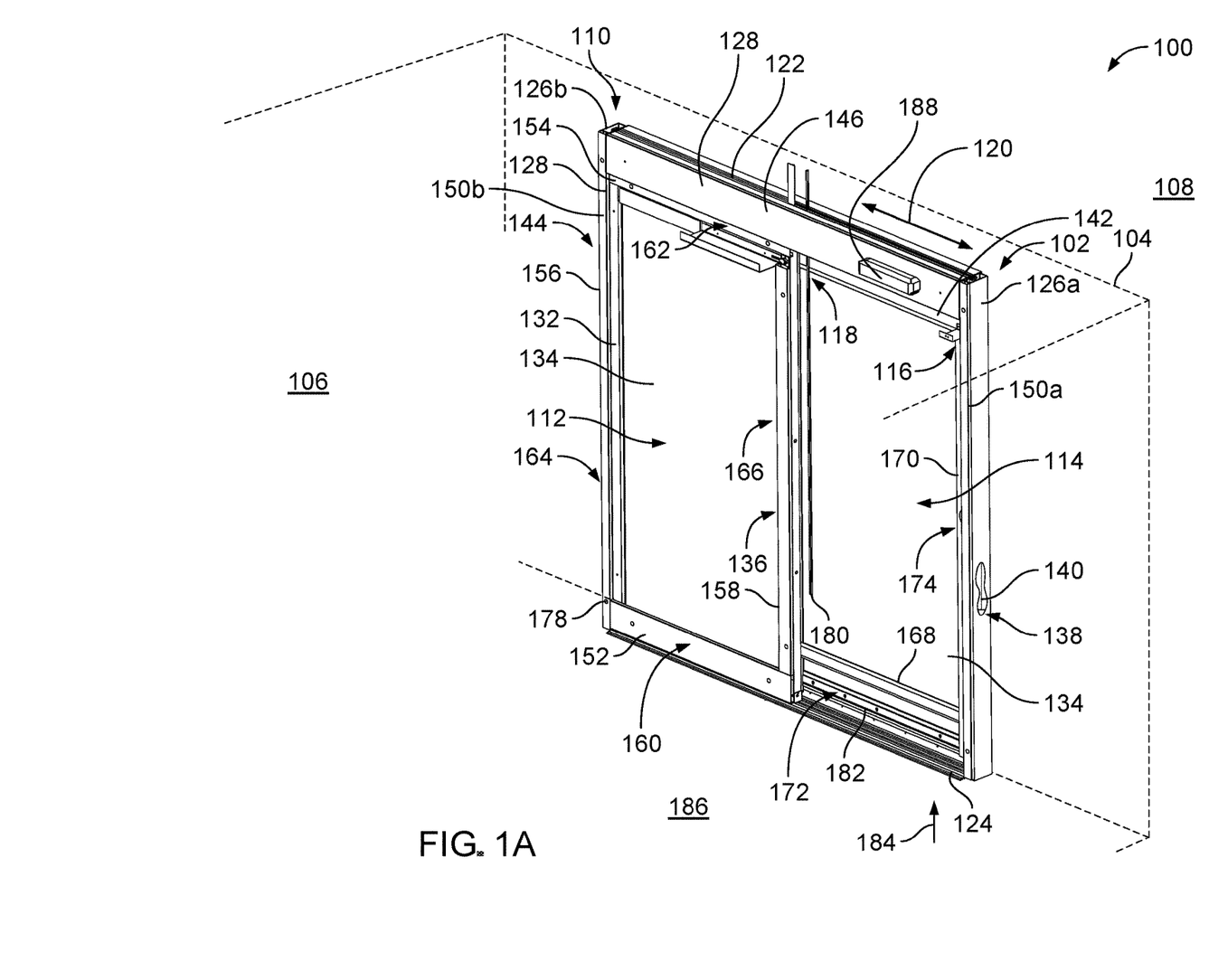
FIG. 1A is a perspective view of an example walk-in refrigerator with an insulated door.
Figure 1B:
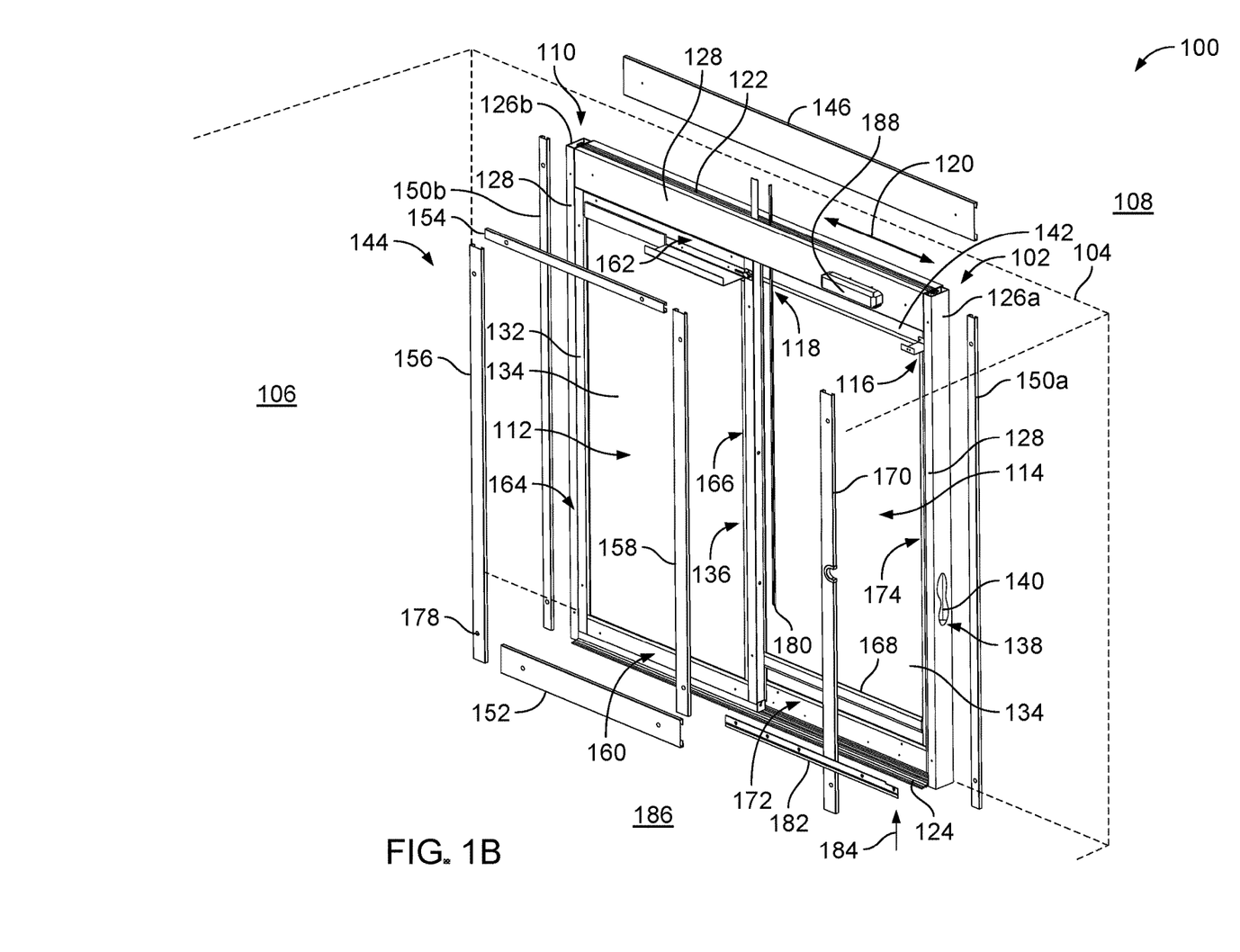
FIG. 1B is exploded perspective view of the insulated door of FIG. 1A.
Figure 1C:
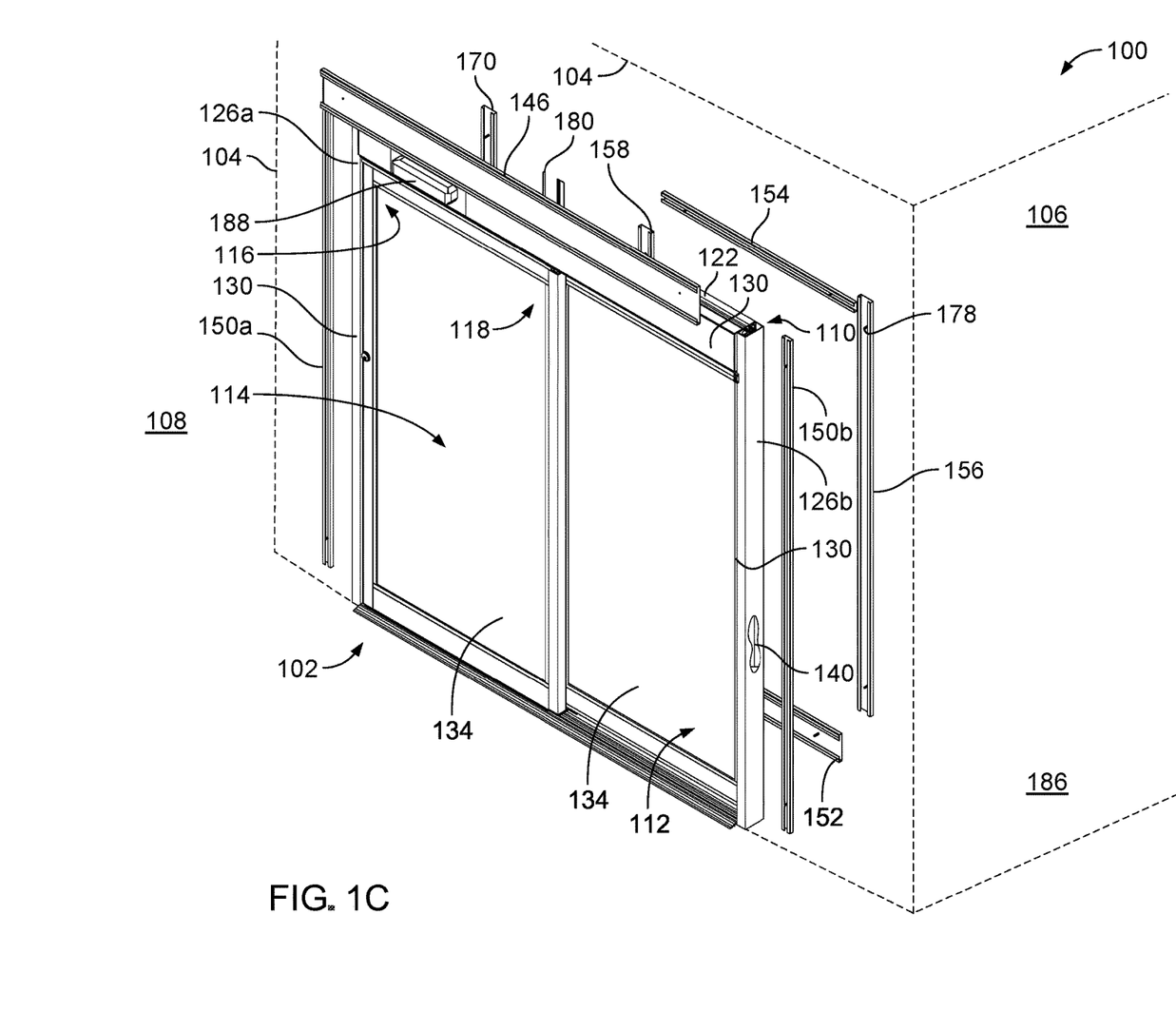
FIG. 1C is another exploded perspective view of the insulated door of FIG. 1A.

FIG. 1A is a perspective view of an example walk-in refrigerator with an insulated door. FIG. 1A is a view of the inner surface (i.e., from inside the walk-in refrigerator). FIG. 1B is an exploded perspective view of insulated door of FIG. 1A (i.e., from inside the walk-in refrigerator). FIG. 1B is a view of the inner surface (i.e., from inside the walk-in refrigerator). FIG. 1C is another exploded perspective view of the insulated door of FIG. 1A. FIG. 1C is a view of the outer surface (i.e., from outside the walk-in refrigerator). Referring to FIGS. 1A-1C, a walk-in refrigerator system 100 has a refrigerator door 102 coupled to a walk-in refrigerated enclosure 104 (also referred to as a walk-in refrigerator or beer cave).

The walk-in refrigerator system 100 contains an inner volume 106 of cooled air at an internal temperature lower than an outer ambient temperature to store items (such as fruit, vegetables, beer, or other alcoholic beverages) in a cooled state and ready for consumption. The walk-in refrigerator system 100 can store foods and beverages in the cooled state to maintain freshness or shelf life and improve customer satisfaction by providing a chilled beverage.

The refrigerator door 102 can be operated by a user relative to a walk-in refrigerated enclosure 104, that is, opened and closed, so the user can enter into the walk-in refrigerator 100 to view and access the foods and beverages (cooled items, not shown) contained in the walk-in refrigerator 100. The walk-in refrigerator door 102 can be a source of loss of cooling capacity from the walk-in refrigerator. For example, cooled air from within the walk-in refrigerator 100 can flow out of the walk-in refrigerated enclosure 104 through the walk-in refrigerator door 102 even when walk-in refrigerator door 102 is closed through gaps or spaces between components and into the walk-in refrigerated enclosure 104 (i.e., ingress into the refrigerated space). For example, heat can be transferred by conduction from space 108 outside the walk-in refrigerator 100 through components of walk-in refrigerator door 102 into walk-in refrigerated enclosure 104. For example, heat can be transferred by thermoconductivity of other components. In some cases, the space 108 outside the walk-in refrigerator 100 is warmer (i.e., has a higher temperature), than the inner volume 106.

The refrigerator door 102 includes an outer frame 110, with a fixed door 112 and a sliding door 114 coupled to and positioned within the outer frame 110. The outer frame 110, the fixed door 112, and the sliding door 114 seal the cooled air in the walk-in refrigerated enclosure 104. The outer frame 110 is coupled to the walk-in refrigerated enclosure 104. The sliding door 114 moves relative to the fixed door 112 within the outer frame 110 to allow the user to enter and exit the walk-in refrigerated enclosure 104. The sliding door 114 moves between a first position 116 (closed, shut) and a second position 118 (open). The sliding door 114, in the first position 116, seals against the outer frame 110 and the fixed door 112 to reduce a flow of air between the walk-in refrigerated enclosure 104 and the space 108 outside the walk-in refrigerator 100. When in the second positon, the user can enter and exit the walk-in refrigerated enclosure 104 through the sliding door 114.

The sliding door 114 slides within the outer frame 110 and relative to the fixed door 112 in the direction of arrows 120 between the first position 116 and the second position 118 to open and close, controlling access to the walk-in refrigerated enclosure 104 and sealing the cooled air in the inner volume 106. Sometimes, the sliding door 114 can break out 90° from any position of slide travel with a max of 50 lbs of force applied to the lock stile of the sliding door 114.

Alternatively, the door 114 can be a rotating door. The door 114 can rotate (not shown) about the outer frame 110 to open and close. For example, the sliding door 114 can articulate about hinges (not shown) on a pivot point to hinges open and close, controlling access to the walk-in refrigerated enclosure 104 and sealing the cooled air in the inner volume 106.

The outer frame 110 can be solid. In some cases, some or all of the outer frame 110 is hollow. The outer frame 110 can be a metal or a polymer. The outer frame 110 can be attached to the walk-in refrigerated enclosure 104 by fasteners (not shown) such as bolts and nuts, screws, rivets, or press-in fasteners. The outer frame 110 has a top side 122, a bottom side 124 (opposite the top side 122), and opposite sides, a left side 126a and a right side 126b, extending between the top side 122 and the bottom side 124. The left side 126a and the right side 126b are identified as viewed from the space 108 outside the walk-in refrigerator 100.

The fixed door 112 is coupled to the right side 126b of the outer frame 110 between the top side 122 and the bottom side 124. The sliding door 114 moves between the closed position 116 contacting the left side 126a preventing access and air flow through the refrigerator door 102 and the second position 118 allowing the user to access the refrigerated enclosure 104. In other implementations, the fixed door 112 and the sliding door 114 can be switched, that is, on the other side, where the fixed door 112 can be coupled to the left side 126a of the outer frame, and the sliding door 114 opens and closes between the fixed door 112 and the right side 126b.

Referring to FIGS. 1A-1B, the outer frame 110 has an inner surface 128 inside the walk-in refrigerator 100 exposed to the inner volume 106. The inner surface 128 of the outer frame 110 extends across the top side 122, the left side 126a, the right sides 126b, and the bottom side 124. Referring to FIG. 1C, the outer frame 110 has an outer surface 130 opposite the inner surface 128 (shown in FIGS. 1A-1B) and outside the walk-in refrigerator 100 exposed to the space 108 outside the walk-in refrigerator 100. The inner surface 128 of the outer frame 110 extends across the top side 122, the left side 126a, the right sides 126b, and the bottom side 124. Referring to FIGS. 1A-1C, a quantity of heat can be transferred through the outer frame 110 between the outer surface 130 and the inner surface 128, reducing the cooling efficiency of the walk-in refrigerator 100.

The fixed door 112 has a fixed door-frame 132 and a glass assembly 134 positioned interior to the fixed door-frame 132. The fixed door-frame 132 is coupled to the outer frame 110. The fixed door-frame 132 can be coupled to the outer frame 110 by fasteners (not shown) such as bolts and nuts, screws, rivets, or press-in fasteners. Alternatively, the glass assembly 134 can be positioned and coupled directly into the outer frame 110 and bordered by a mullion 136 (i.e., a fixed portion extending between the top side 122 and the bottom side 124 between the left side 126a and the right side 126b).

The glass assembly 134 can be a translucent pans so the user can view the cooled items within the walk-in refrigerator 100. The glass assembly 134 can have one or more panes of glass separated by a gas. For example, the glass assembly 134 can be a three-pane glass assembly having three separate glass panes, each separated by a volume or layer of gas. In some cases, the glass assembly 134 is non-heated, that is, there are no external sources of heat positioned within the glass assembly 134 or between the panes of glass.

The sliding door 114 has a sliding door-frame 142 and another glass assembly 134. The glass assembly 134 of the sliding door 114 is positioned interior to the sliding door-frame 142.

Referring to FIG. 1A, the refrigerator door 102 includes a heater system 138 having heater wires 140 coupled to the outer frame 110. In some cases, the heater wires 140 are positioned within and extending through the outer frame 110. In some cases, the heater wires 140 are in contact, but not within, the glass assembly 134. The heater system 138 is electrically and operatively coupled to a controller (not shown) which provides power and control signals to the heater system 138, operating the heater system 138.

Referring to FIGS. 1A-1C, the refrigerator door 102 includes an insulation assembly 144 coupled to the outer frame 110 on the inner surface 128 of the outer frame 110, the fixed door 112, and the sliding door 114. The insulation assembly 144 has multiple insulation panels coupled and covering a portion of the inner surface 128 of outer frame 110, the fixed door 112, and the sliding door 114 to reduce the quantity of heat transferred across the outer frame 110, the fixed door 112, and the sliding door 114 between the inner volume 106 and the space 108 outside the walk-in refrigerator 100.

The insulation assembly 144 has portions coupled to the outer frame 110. The portions of the insulation assembly 144 coupled to the outer frame 110 include a top insulation panel 146 coupled to an inner surface 128 of the top side 122 of the outer frame 110. The portions of the insulation assembly 144 coupled to the outer frame 110 include a pair of side insulation panels 150a,b positioned on inner surfaces 128 of the left and right sides 126a,b of the outer frame 110.

The insulation assembly 144 has portions coupled to the fixed door 112. The portions of the insulation assembly 144 coupled to the fixed door 112 include a bottom insulation panel 152, a top insulation panel 154, a first insulation side panel 156, and a second insulation side panel 158. The bottom insulation panel 152 extends along an inner bottom portion 160 of the inner surface 128 of the fixed door-frame 132. The top insulation panel 154 extends along an inner top panel 162 of the fixed door-frame 132. The first insulation side panel 156 extends along an outer side portion 164 of the interior surface 128 between the top insulation panel 154 and the bottom insulation panel 152. The second insulation side panel 158 extends along an inner side portion 166 of the interior surface 128 of fixed door-frame 132, opposite the first insulation side panel 156. In some cases, the inner side portion 166 corresponds to the mullion 136.

In some implementations, the bottom insulation panel 152, the top insulation panel 154, the first insulation side panel 156, and the second insulation side panel 158 are a single panel. In other words, the bottom insulation panel 152, the top insulation panel 154, the first insulation side panel 156, and the second insulation side panel 158a are a unitary piece, that is, not separate pieces of insulation.

The insulation assembly 144 has portions coupled to the sliding door 114. The portions of the insulation assembly 144 coupled to the sliding door 114 include a bottom insulation panel 168 and an inner side panel 170. The bottom insulation panel 168 extends along an inner bottom portion 172 of the interior surface 130 of the sliding door-frame 142. The inner side panel 170 extends along an inner side 174 of the sliding door-frame 142.

Each of the portions of insulation of the insulation assembly 144 have a cross-section 176. In some cases, the cross-section of the insulation is C-shaped. The opening of the C-shaped cross-section can be positioned to face the inner surface 128.

Each of the portions of insulation of the insulation assembly 144 can include voids 178 extending through the panels. The voids 178 are sized to allow fasteners (not shown) to pass through and couple each of the portions of insulation to the inner surface 128 of the refrigerator door 102. In some cases, the fasteners are rivets. For example, the rivets can be push-in rivets.

Each of the portions of insulation of the insulation assembly 144 can also be coupled to the inner surface 128 of the outer frame 110, the fixed door 112, and the sliding door 114 by double-sided tape.

The refrigerator door 102 includes a center wiper 180 coupled to the fixed door-frame 132 and extending interior to the refrigerated enclosure 104. A portion of the center wiper 180 slides across an outer surface of the glass assembly 134 of the sliding door 114 as the sliding door 114 slides relative to the fixed door 112. For example, the center wiper 180 can be a brush, a foam, or an articulable seal. The center wiper 180 can reduce an infiltration of air from the space 108 outside the refrigerated enclosure 104 past the sliding door 114 and the fixed door 112 into the inner volume 106.

The refrigerator door 102 includes a bottom wiper 182 coupled to the outer frame 110 and extending in an upward direction 184 relative to a bottom surface 186 of the refrigerated enclosure 104. The sliding door 114 is in contact with the bottom wiper 182 and moves relative to the bottom wiper 182. The bottom wiper 182 can reduce an infiltration of air from the space 108 outside the refrigerated enclosure 104 past the sliding door 114 into the inner volume 106.

The walk-in refrigerator 100 has electrical and mechanical refrigeration components, not shown, to control the temperature of the inner volume 106 of the walk-in refrigerator 100. For example, the translucent pane can include an electronic display screen (not shown) or electronic controls (not shown). For example, a refrigeration system with a compressor, a condenser, an evaporator, an expansion device, a controller, and other associated components (all not shown) can decrease the temperature in the inner volume 106 of the walk-in refrigerator 100. The walk-in refrigerator 100 includes sensors 188 which can detect a presence of the user approaching the door, and the controller can move the sliding door 114 between the open position 118 and the closed position 116 based on detecting the presence of the user approaching the sliding door 114 from within or outside the sliding door 114.

Although the following detailed description contains many specific details for purposes of illustration, it is understood that one of ordinary skill in the art will appreciate that many examples, variations, and alterations to the following details are within the scope and spirit of the disclosure. Accordingly, the example implementations described herein and provided in the appended figures are set forth without any loss of generality, and without imposing limitations on the claimed implementations.

The invention claimed is:

1. A refrigeration system comprising:
a refrigerated enclosure; and
a refrigerator door coupled to the refrigerated enclosure, the refrigerator door configured to control access to the refrigerated enclosure, the refrigerator door comprising:
   an outer frame coupled to the refrigerated enclosure;
   a fixed door positioned in the outer frame, the fixed door comprising a first glass assembly having three glass panes separated by gas layers;
   a sliding door positioned in the outer frame, the sliding door configured to slide relative to the fixed door between a first position preventing a flow of air through the outer frame and a second position allowing the flow of air through the outer frame, the sliding door comprising a second glass assembly having three glass panes separated by gas layers;
   a center wiper coupled to the outer frame outside an inner volume of the refrigerated enclosure, the center wiper extending between from a top portion of the outer frame to a bottom portion of the outer frame, the center wiper extending between the fixed door and the sliding door, the center wiper configured to reduce a flow of air between the fixed door and the sliding door;
   a bottom wiper coupled to the outer frame within the inner volume of the refrigerated enclosure on a bottom side of the outer frame, the bottom wiper extending in an upward direction from the outer frame and interior to the sliding door, the sliding door in contact with the bottom wiper, the bottom wiper configured to reduce a flow of air between the sliding door and the outer frame;
   an insulation kit positioned within the inner volume and on an interior surface of the refrigerated enclosure, comprising:
      an outer frame portion comprising:
         a top insulation panel coupled to an inner top surface of the outer frame;
         a pair of side insulation panels positioned on outer side surfaces of the outer frame;
      a fixed door portion comprising:
         a bottom insulation panel extending along an inner bottom portion of the interior surface of the fixed door;
         a top insulation panel extending along an inner top panel of the interior surface of the fixed door;
         a first insulation side panel extending along an outer side portion of the interior surface between the top insulation panel and the bottom insulation panel;

a second insulation side panel extending along an inner side portion of the interior surface corresponding to a mullion of the fixed door and proximal the center wiper, opposite the first insulation side panel;

a sliding door portion comprising:

a bottom insulation panel extending along an inner bottom portion of the interior surface of the sliding door;

an inner side panel extending along an inner side of the sliding door proximal a right side of the outer frame and opposite the center wiper; and a plurality of fasteners comprising at least one of a plurality of push-in plastic rivets and a double-sided tape, the plurality of fasteners coupling each panel to the respective outer frame, the fixed door, and the sliding door; and a heater system comprising a plurality of heater wires coupled to the outer frame, the heating system configured to heat the outer frame.

2. The refrigeration system of claim 1, wherein the first glass assembly and the second glass assembly each comprise comprises a three-pane glass assembly.

3. The refrigeration system of claim 2, wherein the three-pane glass assemblies are non-heated.

4. The refrigeration system of claim 2, wherein each of the panes of the three-pane glass assemblies are separated by a gas layer.

5. The refrigeration system of claim 1, wherein
the fixed door comprises a first three-pane glass assembly coupled to a first frame; and
the sliding door comprises a second three-pane glass assembly coupled to a second frame, the second three-pane glass assembly movable relative to the first three-pane glass assembly.

6. The refrigeration system of claim 5, wherein the first frame is fixed in the outer frame.

7. The refrigeration system of claim 5, wherein the second frame slides relative to the first frame allowing access to an interior of the refrigerated enclosure.

8. The refrigeration system of claim 5, wherein the second frame rotates relative to an edge of the first frame allowing access to an interior of the refrigerated enclosure.

9. The refrigeration system of claim 5, wherein the center wiper is coupled to the first frame and extends in an interior direction toward the refrigerated enclosure, a portion of the center wiper slidably across an outer surface of the second three-pane glass assembly.

10. The refrigeration system of claim 5, wherein the outer side surface panel coupled to an outer side surface of the first frame.

11. The refrigeration system of claim 1, wherein the plurality of heater wires are positioned within the outer frame.

* * * * *

UNITED STATES PATENT AND TRADEMARK OFFICE
CERTIFICATE OF CORRECTION

PATENT NO. : 12,435,917 B2  
APPLICATION NO. : 18/451450  
DATED : October 7, 2025  
INVENTOR(S) : Alexander Khusit Page 1 of 1

It is certified that error appears in the above-identified patent and that said Letters Patent is hereby corrected as shown below:

In the Claims

Column 9, Line 23, Claim 2, delete "comprises a" and insert -- a --.

Signed and Sealed this  
Twenty-fifth Day of November, 2025

John A. Squires  
*Director of the United States Patent and Trademark Office*